US008635609B2

(12) United States Patent
Deblaquiere et al.

(10) Patent No.: US 8,635,609 B2
(45) Date of Patent: Jan. 21, 2014

(54) SOFTWARE CERTIFICATION AND UPDATE PROCESS

(75) Inventors: Joe Deblaquiere, Raleigh, NC (US);
Donald Fischer, Cambridge, MA (US);
Mihai Ibanescu, Cary, NC (US);
Adrian Likins, Raleigh, NC (US);
Jeremy Katz, Arlington, MA (US); Deb Woods, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 1291 days.

(21) Appl. No.: 11/056,292

(22) Filed: Feb. 14, 2005

(65) Prior Publication Data
US 2006/0184927 A1    Aug. 17, 2006

(51) Int. Cl.
*G06F 9/44*    (2006.01)

(52) U.S. Cl.
USPC ........................................................ 717/173

(58) Field of Classification Search
USPC ............ 717/101, 168–176, 115; 707/200, 10, 707/100; 709/206, 223, 220; 719/313; 715/854; 713/1
See application file for complete search history.

(56) References Cited

U.S. PATENT DOCUMENTS

| 5,359,730 | A | | 10/1994 | Marron |
| 5,790,796 | A | | 8/1998 | Sadowsky |
| 5,978,916 | A | | 11/1999 | Randall |
| 6,151,643 | A | * | 11/2000 | Cheng et al. .................... 710/36 |
| 6,282,709 | B1 | | 8/2001 | Reha et al. |
| 6,353,926 | B1 | | 3/2002 | Parthesarathy et al. |
| 6,990,660 | B2 | * | 1/2006 | Moshir et al. ................. 717/171 |
| 7,191,435 | B2 | * | 3/2007 | Lau et al. ...................... 717/168 |
| 7,356,679 | B1 | * | 4/2008 | Le et al. ........................... 713/1 |
| 7,366,996 | B2 | * | 4/2008 | Hoyle ............................ 715/854 |
| 7,526,762 | B1 | * | 4/2009 | Astala et al. ................. 717/171 |
| 2003/0033313 | A1 | * | 2/2003 | Zweifel et al. ............... 707/100 |
| 2004/0015938 | A1 | * | 1/2004 | Taylor .......................... 717/168 |
| 2004/0205709 | A1 | * | 10/2004 | Hiltgen et al. ................ 717/115 |
| 2004/0249914 | A1 | * | 12/2004 | Flocken et al. .............. 709/223 |
| 2005/0125513 | A1 | * | 6/2005 | Sin-Ling Lam et al. ...... 709/220 |

* cited by examiner

*Primary Examiner* — Tuan A Vu
(74) *Attorney, Agent, or Firm* — Lowenstein Sandler LLP

(57) ABSTRACT

An update service is provided for maintaining software of one or more users, or an enterprise. On behalf of users or enterprises, the update service collects information from various software vendors about the certification and updates for their software. Dependencies or issues between the software are determined based on the information collected from the software vendors. A set of applicable updates for particular users or enterprises may then be determined based on the dependencies or issues. The update service may then broker various aspects of the delivery and installation of these updates.

21 Claims, 6 Drawing Sheets

SOFTWARE CERTIFICATION AND UPDATE PROCESS

FIELD OF THE INVENTION

The present invention relates to methods for certifying and updating software products from various software vendors.

INTRODUCTION

Users and enterprises today rely upon complex information technologies. These information technologies usually require computers, servers, and other systems that contain various installed software, such as an operating system, utilities, applications, and device drivers, code libraries, etc. Many of the software products will come from different software vendors, such as independent software vendors. A software vendor can be any entity that distributes software products, even if another entity wrote the software program code.

Software vendors frequently improve their software products, by adding new features, or by fixing known problems. Typically, the software vendors make their software updates available to their users by distributing them on a computer readable medium, such as a compact disc, or over a network, such as the Internet. These updates may or may not be free. For example, the software vendors may offer an update service that may or may not require a subscription fee from the user or enterprise. In addition, the software vendors may send out information, such as emails, brochures, or advertisements, to their registered users regarding the availability of updates.

Unfortunately, users and enterprises face several significant problems in keeping their software updated. Users and enterprises face difficulty and costs in learning when updates are available for their software products. In addition, users and enterprises face difficulties in determining which updates are applicable to their particular systems. Frequently, many users and enterprises remain unaware of many of the software updates applicable to their systems until they encounter problems and contact the software vendor. Other users and enterprises have resorted to searching the Internet or other on-line services, such as a bulletin board, for solutions to problems with their software.

However, the task of maintaining software products can be overwhelming. In many instances, software products can be interdependent, and thus, updates to one software product, such as the operating system, may require updates to several other software products. Typically, if a software vendor's software depends on another software product, one or more of the software vendors may certify their software based on a particular version or level of updates. Nonetheless, in view of the number of software products and software vendors that may be involved, users and enterprises have found it daunting to monitor all of the available distribution channels, journals, Internet forums, and the like, to determine which updates to install and how those updates affect the certification of their software products.

Currently, a software vendor provides information only about their products, and generally does not provide significant information about the products of numerous other vendors that may be of interest to a given user or enterprise. Thus, users and enterprises are left to individually determine and retrieve their software updates. This can be a difficult process.

Indeed, even installing software updates can be a tedious, time-consuming and error-prone process due to the various formats and installation procedures used by different software vendors.

Accordingly, it would be desirable to provide methods that assist users or enterprises in determining which software updates from various software vendors are available, determining which of those updates are applicable to a given user or enterprise, and installing selected updates on the user's or enterprise's system.

SUMMARY

In accordance with the invention, a method of notifying a client regarding a set of software updates is provided. The set of updates includes a parent update generated by a first entity and a child update generated by one or more additional entities. Dependencies between the child update and the parent update are determined. At least one effect of the parent update and the child update on a client is determined based on the dependencies. Information is then sent to the client about the parent update.

In accordance with another aspect of the invention, a method of preparing a set of software updates for a client is provided. A parent update generated by a first entity affects operation of software from the first entity and software from an additional entity that is installed on the client. A configuration of software from the first entity and the additional entity that are installed on the client is determined. The parent update to be installed on the client is identified based on the configuration of software installed on the client. An effect of the parent update on the software installed on the client is determined. A child update for the software from the additional entity is selected to compensate for the effect of the parent update on the operation of the software from the additional entity. Delivery of the parent update and the selected child update on to the client is then brokered.

In accordance with another aspect of the invention, a method of installing a set of updates to software installed on a client is provided. The software includes software provided from a first entity and software provided from an additional entity. The set of updates may include a parent update and a child update. Program code for installing the parent update to software provided from the first entity is received. The parent update is installed. Information brokered from an update service is received. The information indicates a child update that compensates for an effect of the parent update on the software from the additional entity. The child update is retrieved based on the information brokered from the update service and the child update is then installed.

In accordance with another aspect of the invention, a method of brokering updates to software for a computer is provided. Whether an update to a version of a first piece of software exists on the computer is determined. An update to a second piece of software is then determined. The update to the second piece of software may be needed because the second piece of software depends on the first piece of software. Retrieval of the update to the first piece of software and the update to the second piece of software is then brokered on behalf of the computer.

Additional features of the invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodi

DESCRIPTION OF THE EMBODIMENTS

Embodiments of the present invention provide an update service for maintaining software of one or more users, or an enterprise. On behalf of users or enterprises, the update service collects information from various software vendors, such as independent software vendors, about the certification and updates for their software. Dependencies or issues between the software are determined based on the information collected from the software vendors or other sources, such as the users. A set of applicable updates for particular users or enterprises may then be determined based on the dependencies or issues.

The update service may notify users or enterprises at various stages. For example, the update service may provide a notification as updates that depend on each other become available. In addition, the update service may provide a notification (or warning) when one update requires another update that is not yet available. In some embodiments, the update service may disallow one or more updates if they require or depend on other updates that are not yet available.

The applicable updates may be provided to the users or enterprises in various ways. For example, the applicable updates may be provided directly to a user's computer. As another example, an enterprise may provide a server that receives update information from the update service. The server may then distribute the update information to computers within the enterprise.

The update service may broker one or more of its updates in various ways. For example, the update service may retrieve program code for the updates from respective software vendor sites and provide this program code to the users or enterprises. As another example, the update service may proxy a connection between a software vendor's site and the users or enterprises, or may provide a link to the software vendor's sites that can be opened by the users or enterprises. Furthermore, as part of its brokerage function, the update service may arrange for payment (if required) for any of the updates and mediate an appropriate time for installing the updates, for example, based on when they become available.

The update service may provide updates in one or more packages. In some embodiments, the update service provides update code related to the updates, or program code and information for installing a set of updates as part of a single installation process. Alternatively, the update service may provide update code, or program code and information for installing a set of updates over multiple installation processes.

Reference will now be made in detail to the embodiments of the invention, which are illustrated in the accompanying drawings. Wherever possible, the same reference numbers will be used throughout the drawings to refer to the same or like parts.

Figure 1:
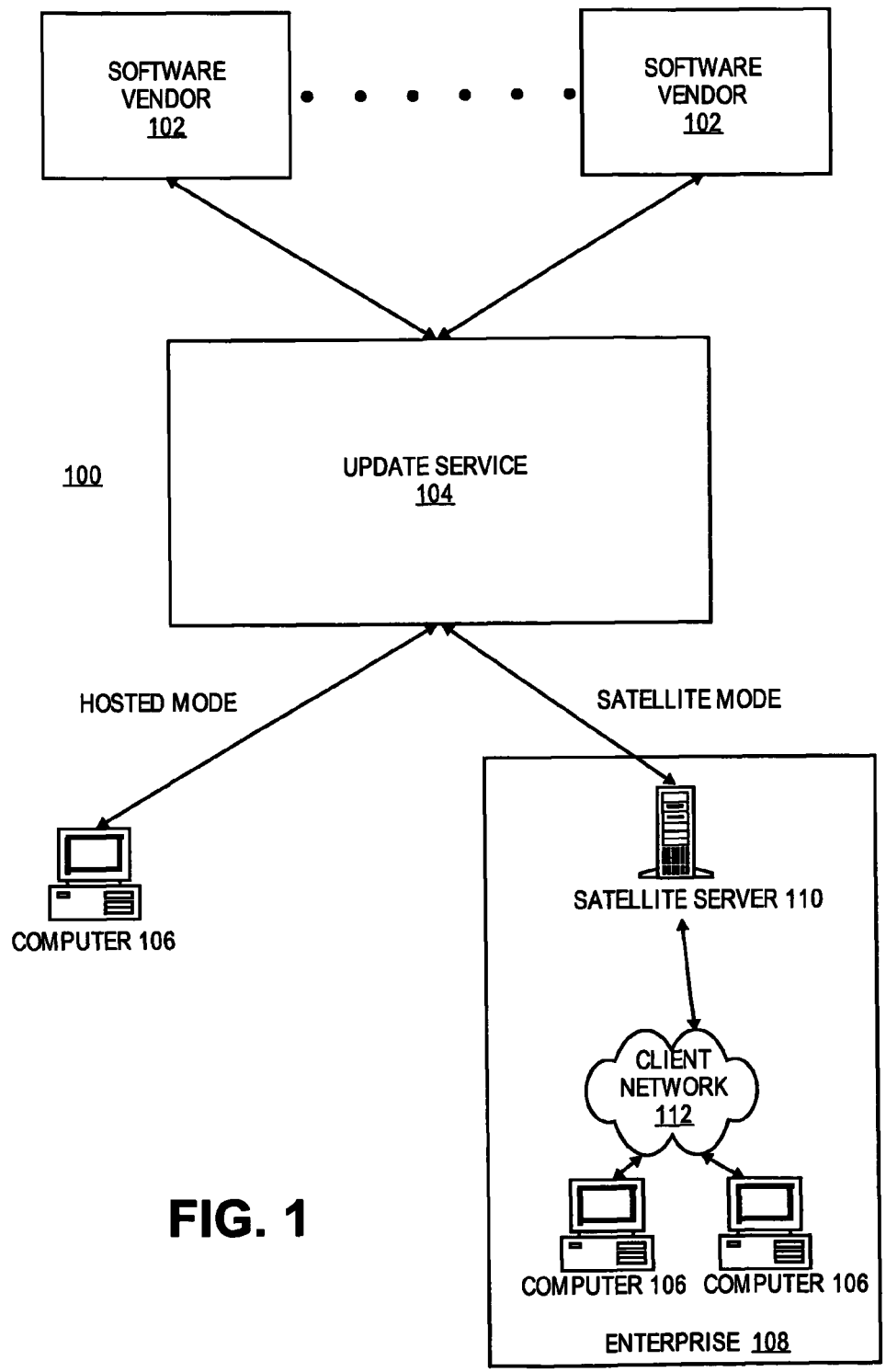
- FIG. 1 shows an architecture of one embodiment of a system for certifying and updating software in accordance with the principles of the present invention.

FIG. 1 shows an embodiment of a system 100 for certifying and updating software in accordance with the principles of the present invention. As shown, system 100 may include a set of software vendors 102 and an update service 104 for certifying and updating software. In some embodiments, system 100 may operate in several modes. For example, in one mode ("hosted mode"), update service 104 is directly coupled to a single client, such as a user's computer 106. Although FIG. 1 depicts a single computer 106, embodiments of the present invention may accommodate any number of clients, users, and computers 106.

In another mode ("satellite mode"), update service 104 provides information to an enterprise 108 that supports a number of clients, such as a plurality of computers 106. Enterprise 108 may comprise any number of computers, networks, and systems. For example, as shown in FIG. 1, enterprise 108 may include a satellite server 110 and a network 112 that couples together a plurality of computers 106. Of course, enterprise 108 may include other components, such as a firewall, or other network elements and may be configured according to other types of known architectures to support computers 106.

The components of system 100 may communicate with each other in a variety of ways. For example, software vendors 102 and update service 104 may be coupled through the Internet, or other network. Update service 104 may also be coupled to computer 106 and enterprise 108 through the Internet, or other network. In particular, the various components of system 100 support various protocols used across the Internet, such as TCP/IP, FTP, HTTP, HTML, etc. In addition, files may be identified in system 100 using universal resource locators (URLs) as known by those skilled in the art.

Alternatively, update service 104 may communicate with the other components indirectly. For example, update service 104 may provide to and receive its information from enterprise 108 and satellite server 110 in the form of a computer readable medium, such as a CD.

The components of system 100 will now be further described. Software vendors 102 may comprise one or more servers that are coupled to update service 104. In some embodiments, software vendors 102 are configured to provide software update information, software products, information files, program code or scripts for installation, and the like. The software update information may include program code for applications, binary files, text files, and the like, for updating software products installed on computers 106. Software vendors 102 may also provide other types of information related to product support, technical service, or the like. Software vendors 102 may further control distribution and payment for their software updates using known techniques, such as credit cards and conventional encryption techniques.

Software vendors 102 may be implemented using one or more computers (not shown) that are known in the art. For example, software vendors 102 may be implemented as a website on the Internet.

Update service 104 provides information related to certifying and updating the software installed on computers 106 or enterprise 108. In some embodiments, update service 104 is implemented as a website on the Internet. Accordingly, update service 104 may include any number of conventional servers (not shown). Such servers may be implemented with an Intel-based processor that executes an operating system, such as the Linux operating system. Furthermore, the servers of update service 104 may support the TCP/IP communication for connecting to the other components of system 100, such as software vendors 102, over the Internet.

Figure 2:
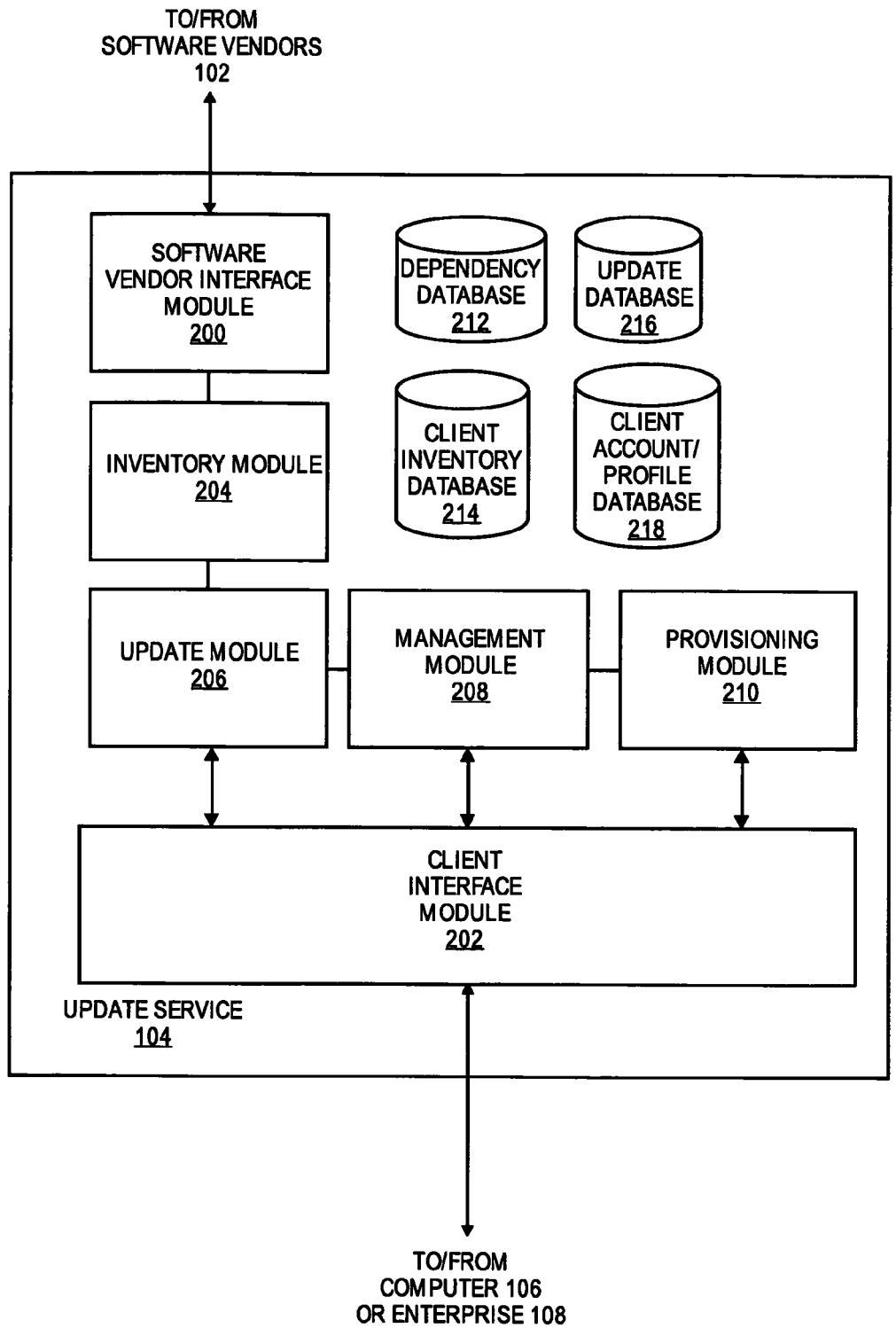
FIG. 2 shows an exemplary architecture for an update service that is consistent with the principles of the present invention.

Of course, one skilled in the art will recognize that update service 104 may include any amount of sufficient hardware to support a relatively large number of multiple computers 106 and enterprises 108 simultaneously for requests for data and other operations. One example of an architecture for update service 104 is shown in FIG. 2.

Computers 106 may be of any known type of computer or computer system. Computer 106 may have installed a number of software products including an operating system, applications, drivers, utilities and the like. In some embodiments, computers 106 may be any device having the Linux operating system installed. Computers 106 are also described with reference to FIG. 3.

Enterprise 108 represents any organization that supports one or more users, for example, with satellite server 110 and network 112. For example, enterprise 108 may be a customer of update service 104.

As shown, enterprise 108 may include satellite server 110 in order to optimize the software installed on computers 106 within a local network of enterprise 108, such as network 112. Satellite server 110 may be any conventional computer or server system known to those skilled in the art. For example, satellite server 110 may be a server that operates based on the Linux operating system and an embedded database (not shown), such as an Oracle database.

As noted above, satellite server 110 can be connected to update service 104, for example, over the Internet. Alternatively, satellite server 110 can run disconnected from update service 104 and instead receive information in the form of a computer readable medium.

In addition, enterprise 108 may include other servers to assist the operations of satellite server 110. For example, enterprise 108 may include proxy servers that run either in hosted mode or satellite mode, which function as an intelligent cache that is attached to enterprise 108. Of course, other architectures for enterprise 108 are consistent with the principles of the present invention.

Network 112 provides a communication infrastructure for computers 106 that belong to enterprise 108. Network 112 may be implemented based on known topologies and components. For example, network 112 may be implemented based on one or more local area networks, such as an Ethernet network, a wide area network, the Internet, or the like.

FIG. 2 shows an exemplary architecture for update service 104 that is consistent with the principles of the present invention. In accordance with the present invention, the update service 104 includes a number of executable components and database structures useful for certifying and updating software installed on computers 106. As shown, update service 104 may include a software vendor interface module 200, a client interface module 202, an inventory module 204, an update module 206, a management module 208, and a provisioning module 210. These components may be implemented based on known components of hardware and software. For example, these components may be implemented as applications running on one or more conventional servers. In some embodiments, the servers of update service 104 run applications and the Linux operating system. In addition, update service 104 may include one or more embedded databases. For example, as shown, update service 104 may include a dependency database 212, a client inventory database 214, an update database 216, and a client account/profile database 218. These databases may be implemented based on any known schema, for example, as a relational or object oriented database. Of course, one skilled in the art will recognize that update service 104 may include or be coupled to other databases, such as a database that maintains information about the software from software vendors 102, or the software itself. The functions of these exemplary components of update service 104 will now be further described.

Software vendor interface module 200 manages communications between update service 104 and software vendors 102. For example, software vendor interface module 200 may be configured to periodically poll software vendors 102 on a regular basis to request update information for the respective software products of the software vendors 102. As another example, software vendor interface module 200 may be configured to passively monitor for update information from software vendors 102.

The information from software vendors 102 regarding updates may include a wide variety of data and may be in any format. For example, information from software vendors 102 that may be considered useful includes version information, file formats, configuration information, and network location, such as a URL on the Internet. Alternatively, software vendor interface module 200 may be configured to obtain software update information from software vendors 102 by searching the Internet to identify who of software vendors 102 are providing updates to their software products. Software vendor interface module 200 may then download the updates from the sites for software vendors 102, or store one or more network locations (URL) where the download for an update can be obtained.

Client interface module 202 manages communications by update service 104 in either hosted mode or satellite mode with update module 206, management module 208, or provisioning module 210. Those skilled in the art will understand client interface module 202 may interact with computer 106 in hosted mode or satellite server 110 in parallel and in ways that are specific to a particular user or enterprise 108.

For example, client interface module 202 may provide one or more pages that authenticate the identity of computer 106 or enterprise 108, such as a user ID, password, digital certificates, and the like. This information may be manually entered by a user at computer 106 or satellite server 110, or may automatically provided once a connection is established. In addition, client interface module 202 may be configured to collect other information, such as contact information, a mailing address, an email address, and payment information. Of course, client interface module 202 may also provide instructions and a process for registering a new user or new enterprise. As another example, client interface module 202 may also provide information indicating the availability of updates for various software products or the current certification status of software products.

Inventory module 204 analyzes computers 106 or enterprise 108 to determine the installed software products and maintain an inventory of this software. As noted, these software products may be from any of software vendors 102. In some embodiments, inventory module 204 may maintain its information in client inventory database 214. For example, the inventory module 204 may operate with client interface module 202 to periodically request or collect a list of software installed in computers 106 or enterprise 108.

Update module 206 operates in conjunction with update database 216 and maintains and provides information identifying software products, information about the software updates that are available from software vendors 102 for their software products, information for identifying software products installed on computers 106, and information for uniquely distinguishing the versions and names of installed software products. In addition, update module 206 may include conventional software and hardware that provide a graphical user interface through client interface module 202 for accessing the above-indicated information, a notification service regarding the software updates, a dependency checking feature, and an auto-update feature.

Management module 208 assists update module 206 and allows for role-based administration for policies and permissions, and scheduled actions. For example, management module 208 may operate with satellite server 110 to provide a custom channel of updates for enterprise 108, local package caching for enterprise 108, and off-network capabilities.

Provisioning module 210 works in conjunction with update module 206 and management module 210 to allow for provisioning of software to computers 106, configuration management of computers 106. For example, provisioning module 210 may assist computers 106 or enterprise 108 with uninstallation, and multi-state rollback or recovery of updates. In addition, provisioning module 210 may assist in scheduling remote actions, such as the installation of the updates, and kick starting configuration tools. For example, provisioning module 210 may be configured to provision operating systems and one or more applications on to computer 106.

Dependency database 212 maintains information related to the dependencies between software products. For example, dependency database 212 may include information that indicates an application is dependent upon a particular version of a Linux operating system kernel. Dependency database 212 may use any known schema to structure this information.

Client inventory database 214 maintains information identifying which software products are installed on computers 106. For example, client inventory database 214 may include information indicating one or more operating systems and applications installed on computers 106. This information may indicate data, such as a version number or release number.

Update database 216 maintains the information related to obtaining updates for the various software products from software vendors 102. For example, update database 216 may store information describing an installation process for installing a software update. This information may include configurations supported, a file format, or other data useful to performing the installation of the software update. In some embodiments, update database 216 may include the program code for installing the updates.

For example, update database 216 may include a schema or data structure that indicates a company name for each of software vendors 102, a software product name, a product type, information to identify the software product on computer 106, a file name or string used to identify products from software vendors 102, version information, and dates or a timestamp. The product type can be an operating system component, such as a device driver, or an operating system file, or an application.

In other embodiments, however, update database 216 does not itself store the software updates, but rather stores information, such as URLs, that allow update service 104 to broker access to the software update. In turn, computers 106 or satellite server 110 may access the software updates through update service 104, or directly from software vendors 102.

Client account/profile database 218 maintains the information related to authenticating a user or enterprise and determining their respective rights. For example, a user or enterprise may select various categories or channels of content in which they are interested in receiving updates. A channel may provide information related to one or more variations of an operating system, specific applications from software vendors 102, and configuration files. In addition, a user or enterprise may subscribe to multiple channels of content from update service 104. Database 218 may further include information that indicates the permissions and delivery of the information in a channel.

Other information that may be included in client account/profile database 218 may comprise groups defined in an enterprise, system and individual permissions, activation keys, registration information, and payment information (such as credit card information). Furthermore, client account/profile database 218 may include other information related to the manner in which update service 104 provides information. This information may relate to periodicity of notifications, email addresses, format of the information, and the like. Furthermore, client account/profile database 218 may be used by update service 104 to log the activities and transactions of its users. Activities that are typically logged are well known to those skilled in the art.

Figure 3:
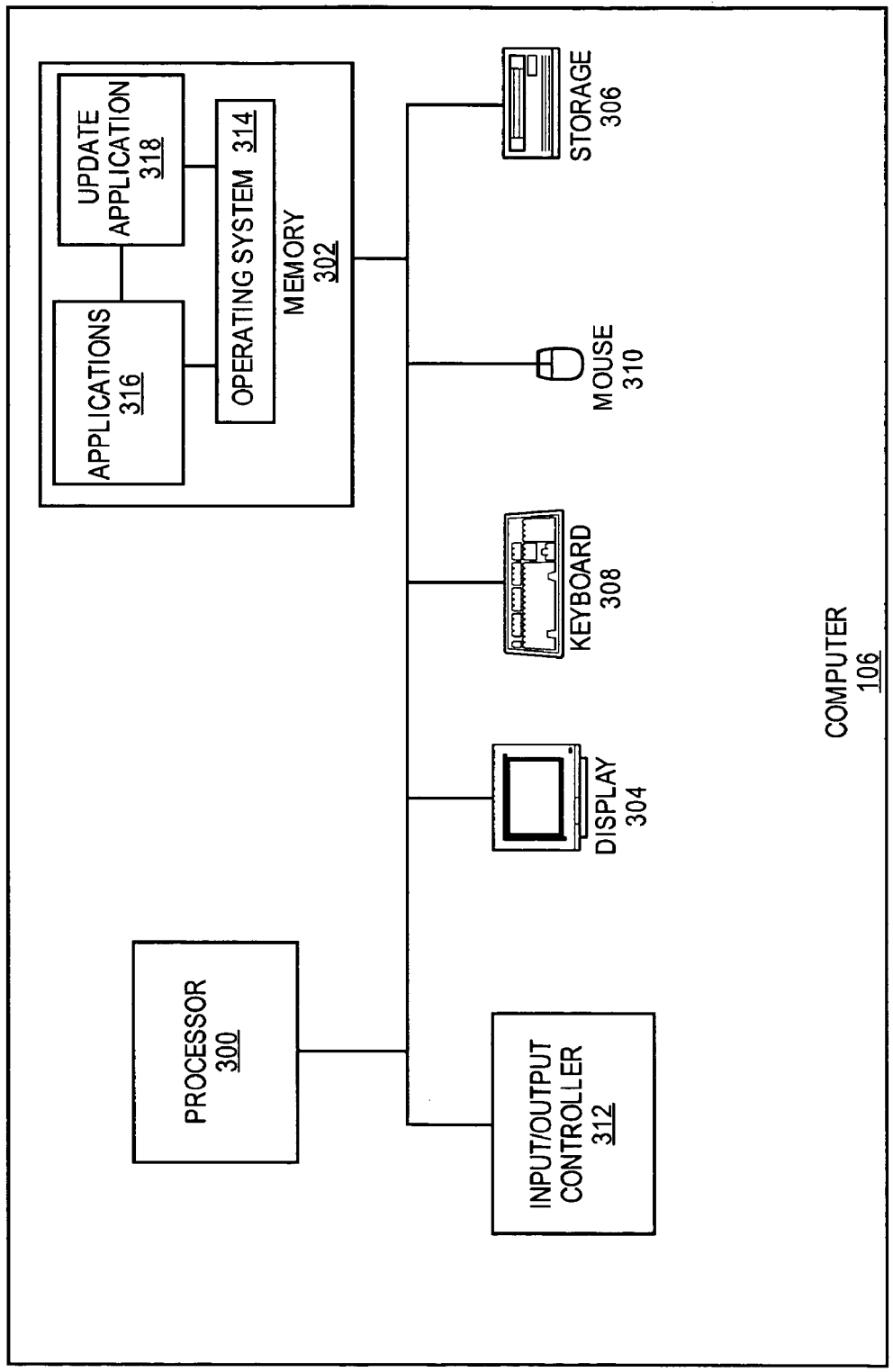
FIG. 3 shows one example of the hardware and software architecture of a computer.

FIG. 3 shows one example of the hardware and software architecture of computer 106. As shown, computer 106 may be a conventional device that includes a processor 300, a memory 302, and other known features, such as a display 304, a storage device 306, such as a hard disk, a keyboard 308, a mouse 310, and an input/output controller 312, such as a network interface.

Computer 106 further may have software products installed in memory 302 including an operating system 314, applications 316, and an update application 318. In some embodiments, these software products are among those whose updates are brokered by update service 104.

Operating system ("OS") 314 is an integrated collection of routines that service the sequencing and processing of programs and applications run by computer 106. OS 314 may provide many services for computer 106, such as resource allocation, scheduling, input/output control, and data management. OS 314 may be predominantly software, but may also comprise partial or complete hardware implementations and firmware. Well-known examples of operating systems that are consistent with the principles of the present invention include Linux, Mac OS by Apple Computer, Open VMS, AIX by IBM, Java and Sun Solaris by Sun Microsystems, Windows by Microsoft Corporation, Microsoft Windows CE, Windows NT, Windows 2000, and Windows XP.

In some embodiments, updates to the components of OS 314 may be brokered by update server 104. For example, OS 314 may be a Linux operating system, and thus, may comprise a kernel, kernel modules, loadable kernel modules, system shared libraries, and the like. OS 314 may also include or be coupled to system management programs, user processes (for running applications 316), user utility programs, and compilers. Any of these components may be subject to an update that is generated by one of software vendors 102 and brokered by update service 104. For example, updates to kernel modules from software vendors 102 may be brokered by update service 104.

Applications 316 may be "loaded" (i.e., transferred from storage 306 into memory 302) for execution by computer 106. For example, applications 316 may be applications, such as a browser, a firewall, a word processor, and the like that are provided from software vendors 102. Other examples for applications 316 are well known to those skilled in the art.

Update application 318 maintains an inventory of the software installed on computer 106 and archives one or more states of computer 106. In some embodiments, update application 318 archives the state of computer 106 prior to each update installation. In addition, update application 318 may be configured to transmit the software inventory of computer 106 to satellite server 110 or update service 104. In turn, the software inventory of computer 106 may be stored as part of the information in client inventory database 214.

For example, update application 318 may be configured to periodically connect to satellite server 110 or update service 108 to access client inventory database 214. Update application 318 may then download or request a portion of database 214 that is applicable to computer 106.

Various processes for certifying and updating software will now be described with reference to FIGS. 4-6. In general, a user or enterprise (such as enterprise 108) may subscribe to one or more channels provided by update service 104. Update service 104 collects and maintains information related to software installed on computers 106 of the user or enterprise 108. Update service 104 may then track dependencies between software products, such as the dependency between operating system components or between an operating system and an application, and monitor the progress of these updates. Update service 104 may notify its users when the progress of updates reaches various stages, such as when updates become available or when updates are not yet available. Finally, update service 104 may broker the delivery or installation of the updates in a manner that optimizes their effect. For example, update service 104 may broker several updates that are related or dependent upon each other. The brokering of updates may range, for example, from providing the program code for the update to providing one or more links to the update. The delivery or installation of the updates may be implemented under the control of update service 104, or under the control of the user or enterprise 108.

Figure 4:
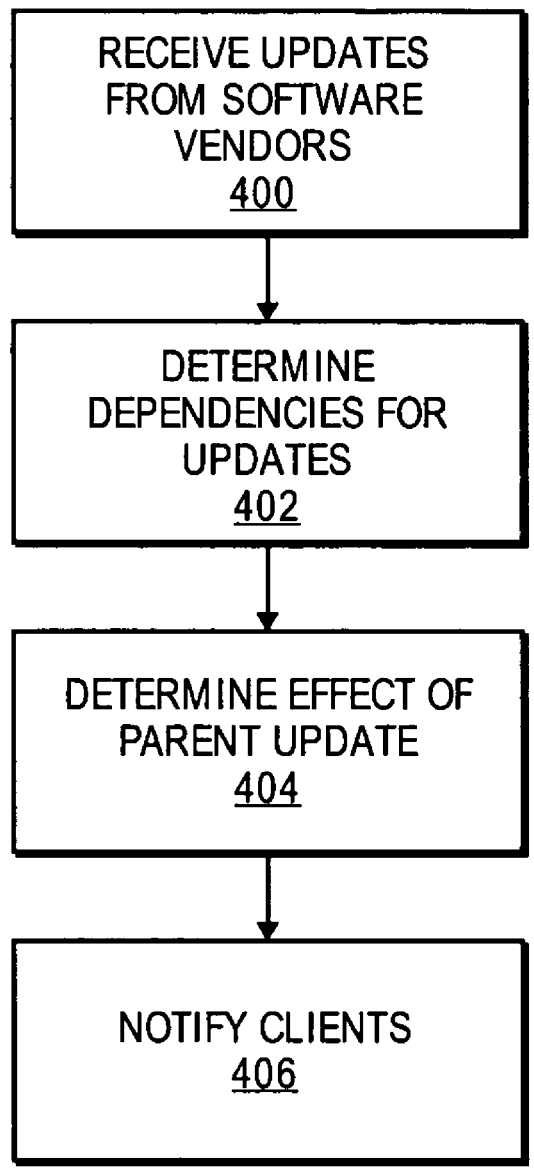
FIG. 4 illustrates a process for collecting updates for software and notifying users of the update service in accordance with the principles of the present invention.

FIG. 4 illustrates a process for collecting updates for software and notifying users of the update service in accordance with the principles of the present invention. In stage 400, update service 104 receives update information from software vendors 102. For example, as new software updates become available from software vendors 102, either update module 206 of update service 104 or software vendors 102 accesses update database 216. In some embodiments, software vendors 102 may provide data that includes one or more fields for: new update information, or changes to existing update information; information describing the update; a URL for the information on the software update; version information; dependency information, such as other software products affected by the update; the type of update; known incompatibilities or errors; a URL for locating prior versions of the software product to be updated; and a URL for the software update itself. In addition, update service 104 may collect the installation procedures, such as an installation script for the updates.

As noted, software updates may be collected into update database 216 in various ways. For example, software vendor interface module 200 may periodically search the Internet to identify any software vendors 102 that are providing updates of software products. Upon finding a software update, software vendor interface module 200 may work in conjunction with update module 206 to download the software updates to update database 216.

While gathering the information for the updates, update module 206 may determine a file format of the software update and the installation process specified according to the file format of the software update based on information provided by software vendors 102. In some embodiments, software vendors 102 may provide the information about their software products and software updates, such as name, file format, and so forth, based on a contractual relationship with update service 104, enterprise 108, or users at computers 106.

Update module 206 may make entries into update database 216 to include the URL or network location of servers for software vendors 102 that can provide the update, to store the software update itself, the file format of the software update, and the installation process. Also, a URL to a description about the software update, such as the problems that the update fixes or features added may be stored in update database 216. Of course, one skilled in the art will recognize that either software vendors 102 or update service 104 may specify the entries that are made into update database 216. Processing may then flow to stage 402.

In stage 402, update module 206 determines dependencies between the software updates. In some embodiments, update module 206 may evaluate dependencies between updates based on a parent/child model. A parent software update may be any update that influences or requires another update known as the child software update. A parent update may give rise to any number of child updates or even other parent updates. A dependency may span across one or more of software vendors 102.

For example, dependencies between various updates may be explicitly specified in the information provided from software vendors 102. In addition, update module 206 may determine dependencies between software updates based on other techniques. For example, updates to an operating system kernel may give rise to the need for child updates to other components of the operating system, such as the kernel modules, device drivers, and the like. As another example, one or more updates to an operating system kernel may give rise to child updates to one or more applications that were certified for a previous version of the kernel. These are just a few examples of how update module 206 may determine the dependencies and the nature of these dependencies between software updates. Processing may then flow to stage 404.

In stage 404, update service 104 determines if there any effects for each parent update. For example, update module 206 may determine the effect of a particular parent update based on the dependency information provided from software vendors 102. In addition, update module 206 may also consider other criteria in determining the effect of parent updates. The nature of the effect created by a parent update may encompass a wide range of situations. For example, a parent update to an operating system kernel may cause errors in the operation of the operating system components. Thus, the effect of that parent update would be those errors and one or more child updates may be selected to correct the errors. Of course, one skilled in the art will recognize that other types of effects may be determined, such as effects related to adding a new feature to a software product. Processing may then flow to stage 406.

In stage 406, update service 104 may send information to the client related to the set of updates. For example, client interface module 202 may provide information to computers 106 or enterprise 108 in the form of one or more web pages. The information provided may include information about the parent update, any effects of the parent update, information about one or more of the child updates, and the like.

Client interface module 202 may also be configured to send information based on the information in client account/profile database 218. As noted above, client account/profile database 218 maintains a profile for each user of update service 104. This information may contain information about which software products a user or enterprise 108 has shown an interest, for example by requesting notification about software updates for specific products, or about new software products. Accordingly, client interface module 202 may deliver notifications about updates available for these products to the user, for example by email, or other electronic communications mechanisms. The information about an update from client interface module 202 may include, for example, a URL or link to access the software update files.

In another example, client interface module 202 may notify the users of update service 104 at various times to indicate the progress of availability of software updates. In particular, for a given parent update, one or more child updates may or may not yet be available from software vendors 102. As these updates become available, client interface module 202 may then notify the users of update service 104 about the status of these updates.

As another feature, client interface module 202 may work in conjunction with update module 206, management module 208, and provisioning module 210 to check for conditions that must be satisfied for the software update or software product to be installed on one of computers 106 or within enterprise 108. For example, these conditions may be based on the channels to which enterprise 108 has subscribed or based on the versions of the software product to which an update is applicable.

Figure 5:
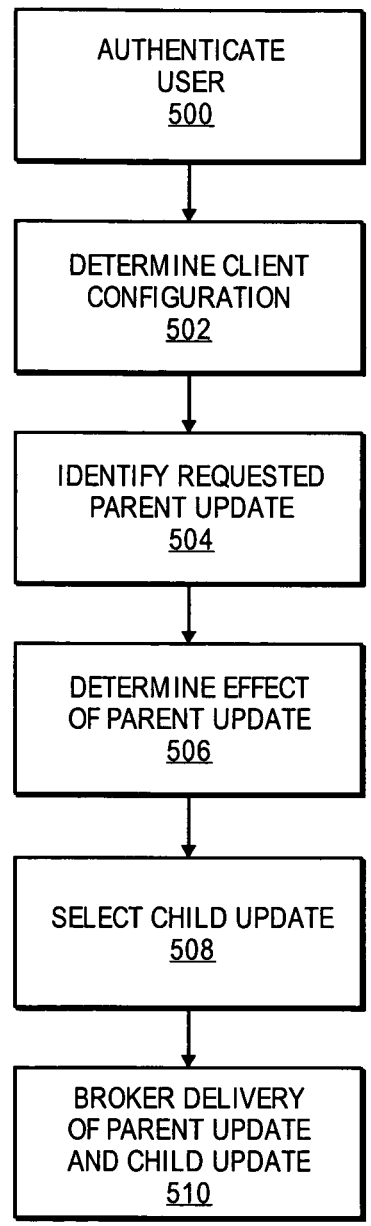
FIG. 5 illustrates a process for preparing a set of updates in accordance with the principles of the present invention.

FIG. 5 illustrates a process for preparing a set of updates in accordance with the principles of the present invention. In stage 500, update service 104 may authenticate the request for the set of updates. A user at computer 106 or from enterprise 108 may manually initiate this process, or it may occur automatically, for example at preset periods, such as once every few hours, daily, weekly, or once a month. Alternatively, this process may be initiated by update service 104 at various intervals, or in response to particular events.

Update service 104 may then proceed with the authentication in various ways. For example, update service 104 may determine whether the software updates are free updates or not and check client account/profile database 218 for payment information. Update service 104 may then arrange for payment, for example, based on the subscription attributed to the user, or connect the user to a software vendor 102. Processing may then flow to stage 502.

In stage 502, update service 104 determines the configuration of software products that are installed on the client. In particular, inventory module 204 analyzes computers 106 or enterprise 108 to determine the installed software products. As noted, these software products will typically be from one or more of software vendors 102.

In some embodiments, inventory module 204 may perform its analysis based on the information in client inventory database 214. Alternatively, inventory module 204 may submit a request to computers 106 or enterprise 108 for the list of installed software products. For example, update application 318 may be invoked at various times to analyze the software installed on computer 106. The information may then be provided to update service 104. Processing then flows to stage 504.

In stage 504, update service 104 may identify one or more of the software updates as a parent update. For example, update module 206 may consider the update that was requested as the parent update. Update module 206 may also analyze the configuration of the installed software products and determine that one or more parent updates are required. For example, update module 206 may query update database 216 to determine if there are updates available for the installed software products. Update module 206 may then query dependency data 212 and determine the respective dependencies between any of the available updates. Based on these dependencies, update module 206 may then determine that one or more parent updates should be selected. Processing then flows to stage 506.

In stage 506, update service 104 may determine any effects of the parent update on the software installed. For example, update module 206 or management module 208 may query update database 216 to determine the effects of a parent update.

In stage 508, update service 104 may select one or more child updates for the software. For example, based on the identified parent updates, update module 206 may query dependency database 212 and select various child updates that arise from the parent updates. Update module 206 may select child updates that compensate for any effects, such as an error or new feature, of the parent update based on the information in dependency database 212. Alternatively, update service 104 may allow a user at computer 106 or within enterprise 108 to select the child updates. For example, client interface module 202 may provide the list of possible software updates to the user. The information provided may include the name of each software product and comments indicating the status of an installed software product. The comments may describe the nature of the software update, such as whether the update corrects a known problem or provides new features.

In some embodiments, client interface module 202 allows for the retrieval of additional information that is requested about a software product. This information may be stored, for example, in update database 216, or may be obtained from software vendors 102, for example by using URLs. A user may then select one or more of the updates that are to be provided by update service 104. Processing may then flow to stage 510.

In stage 510, update service 104 brokers the delivery or installation of the parent update and any child updates. For example, client interface module 202 may request that the user confirm or cancel the installation of the set of updates. If confirmed, update module 206 may then arrange for the download of the software updates, along with installation information, such as installation programs, files, and the like, to computers 106 or satellite server 110.

Update module 206 may broker the delivery or installation of the parent update and any child updates in a variety of ways. For example, update module 206 may directly download the update code or installation files for either the parent update or child update from update database 216. Alternatively, update module 206 may provide a link or redirect a connection to obtain the update code or installation files directly from software vendors 102, using the URL data stored in update database 216. Any combination of these techniques may be used for the updates. In addition, update module 206 may broker the installation of the parent update and any child update in various sequences. For example, update module 206 may broker the installation of the updates such that the parent update and child updates are installed simultaneously or sequentially. Installation of the parent update and child update may be in any order, for example, based on user preferences. Furthermore, the installation of the parent update and child update may occur at separate times.

Figure 6:
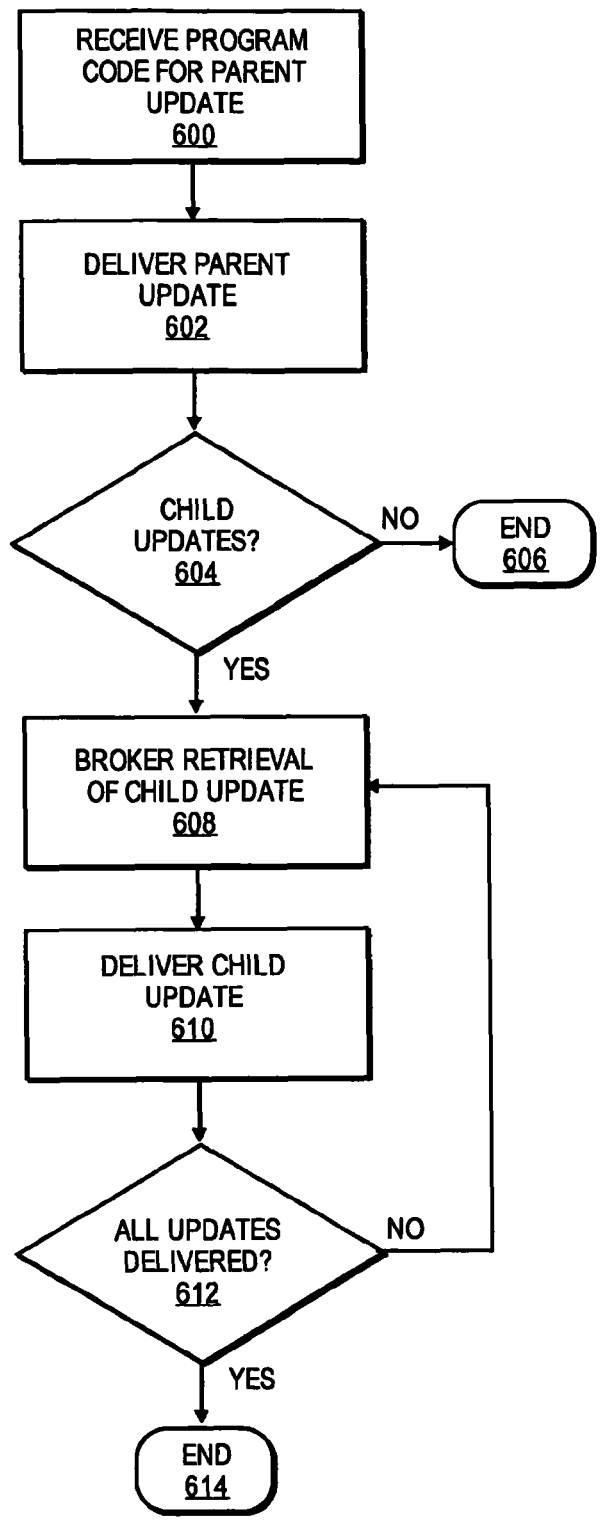
FIG. 6 illustrates a process for installing a set of updates in accordance with the principles of the present invention.

FIG. 6 illustrates a process for installing a set of updates in accordance with the principles of the present invention. In stage 600, computer 106 receives program code for the parent update. The program code may be a package that includes one or more installation programs, files, and the like. Alternatively, computer 106 may receive the update code for the update. As noted above, computers 106 may receive the program code directly from update service 104 or indirectly via satellite server 110. The program code may be received over a network, such as the Internet, or in the form of a computer readable medium.

In stage 602, computer 106 (or satellite server 110) proceeds with taking delivery of the parent update. For example, computer 106 may invoke update application 318 upon receiving the program code or upon execution of at least part of the program code. In response, update application 318 may archive the current state of computer 106 and then record changes made to computer 106 as a result of the installation of the software update. Update application 318 may then proceed with taking delivery of the parent update, for example, by performing any decompression, installation, or setup applications necessary to install the software update.

In addition, in some embodiments, update application 318 records any changes made to computer 106, including changes to various configuration files, additions or deletions of files, and additions or deletions of directories and reports this information back to update service 104. Processing may then flow to stage 604.

In stage 604, computer 106 (or satellite server 110) may determine if there are any child updates that are related to the parent update. For example, computer 106 (or satellite server 110) may receive information, such as a URL, that Vindicates a child update that is related to the parent update. As another example, computer 106 (or satellite server 110) may receive one or more messages from update service 104 that indicates whether a child update is related to the parent update. Such messages and their format are known to those skilled in the art. The information from update service 104 may also include information from software vendors 102, such as information explaining the nature and purpose of the child update and its dependency information. If computer (or satellite server 110) does not find a child update or finds information that indicates the lack of a child update, then processing may flow to stage 606. In stage 606, computer 106 (satellite server 110) may proceed with completing the installation of the parent update and then processing may end. One skilled in the art will recognize that computer 106 (or satellite server 110) may complete their processing in a variety of ways, such as sending a message to update service 104 or displaying a message to the user that installation of updates is complete.

If computer 106 (or satellite server 110) determines a child update is pending, then processing may flow to stage 608. In stage 608, computer 106 (or satellite server 110) receives information brokered from update service 104 that indicates a child update. As noted above, the delivery or installation of the child update may be brokered with the parent update because the child update may compensate for an effect of the parent update on the software installed on computers 106. The information may include additional program code for installing the child update, such as the update code for the update, installation application, and files. Alternatively, the information may include a link, such as a URL. The information brokered from update service 104 may also relate to other aspects of installing the child updates, such as payment, and authentication. Processing may then flow to stage 610.

In stage 610, computer 106 (or satellite server 110) retrieves the child update based on the information brokered from update service 104. For example, computer 106 may download the program code for taking delivery of or installing the child update from update database 216. Alternatively, computer 106 may open a connection to the URL at software vendors 102 provided from update service 104 and download the program code for installing the child update from this location. Processing then flows to stage 612.

In stage 612, computer 106 (or satellite server 110) determines whether any further updates are pending. One skilled in the art will recognize that this stage of processing may be performed in conjunction with or subsequent to the installation of any of the parent or child updates retrieved in the previous stages. Computer 106 (or satellite 110) may determine if further updates are pending based on the information brokered from update service 104. For example, update service 104 may provide one or more messages or links that indicate additional updates are related or dependent on a parent update. As another example, update service 104 may provide a message or link that indicates all updates have been delivered to computer 106 (or satellite server 110). If all updates have not been delivered, then processing may repeat, for example, at stage 608. If all updates have been delivered, then processing may proceed to stage 614.

In stage 614, computer 106 (or satellite server 110) may complete their processing. For example, computer 106 (or satellite server 110) may complete taking delivery of the parent updates and any child updates. Computer 106 (or satellite server 110) may then proceed with installing the parent and/or child updates. Of course, the installation of the parent and child updates may proceed at various times. For example, computer 106 may perform decompression, installation, and execute setup applications necessary to install the parent or child software updates at predetermined times automatically, or upon command by a user or administrator. Of course, one skilled in the art will recognize that this process may be individually repeated for each update, or simultaneously as the updates are delivered.

In addition, when all of the software updates have been installed, computer 106 or satellite server 110 may log out from its session with update service 104. In some embodiments, client interface module 202 may then request any necessary payment information. Alternatively, no payment may need to be directly made, as the cost of update service 104 may be included in the cost of a subscription to one of the channels or charged separately by software vendors 102. In some embodiments, update service 104 may mediate connections through the Internet for making payment to software vendors 102 as part of its brokering of the updates.

Other embodiments of the invention will be apparent to those skilled in the art from consideration of the specification and practice of the invention disclosed herein. For example, embodiments of update service 104 may also support brokering the uninstallation of one or more updates. In this situation, update service 104 may thus assist computer 106 or satellite server 110 in determining which updates should be uninstalled and/or provide other updates that assist in recovering from the uninstallation.

A user at computer 106 or within enterprise 108 may decide to undo or uninstall one or more of the updates, for example, due to dissatisfaction with a software product or its new features. Accordingly, update service 104 may be configured with an uninstall feature, for example via provisioning module 210, that backs-out any previous installation it brokered. This feature may rely on archived information stored in client inventory database 214. One skilled in the art will recognize that uninstallation will involve conventional techniques, such as deleting files and directories that were added, restoring files and directories that were deleted, and restoring files that were otherwise changed. Similar to the installation process, an uninstallation feature of update service may be performed based on uninstalling parent updates and their child updates. The uninstallation may also be performed simultaneously or in series at various times. Furthermore, if any payments were made for the software updates, update service 104 may broker the refund or crediting of these costs.

Nonetheless, it is intended that the specification and examples be considered as exemplary only, with a true scope and spirit of the invention being indicated by the following claims.

What is claimed is:

1. A method comprising:
receiving, by a processor at a server system, update information for a plurality of software programs comprising a first software program provided by a first vendor and a second software program provided by a second vendor, wherein the first vendor is distinct from the second vendor, wherein the first software program comprises an operating system component, wherein the second software program comprises an application, wherein the application complements operation of the operating system component, and wherein the update information comprises dependency information regarding the application being dependent on updates to the operating system component;
determining, by the server system, a dependency of the application on a parent software update to the operating system component in view of the dependency information;
receiving, by the server system, a request from a client computer for updates to the operating system component at the client computer, wherein the parent software update is responsive to fulfilling the request for updates to the operating system component at the client computer;
determining, by the server system, an effect of the parent software update on the application at the client computer in view of the dependency information;
selecting, by the server system, a child software update that modifies the application to compensate for the determined effect of the parent software update on the application at the client computer, wherein the second vendor provides the child software update and the first vendor provides the parent software update; and
in response to receiving the request, causing the parent software update and the child software update to be sent to the client computer and installed at the client computer.

2. The method of claim 1, wherein the operating system component comprises an operating system kernel, and wherein the parent software update comprises an update to the operating system kernel.

3. The method of claim 2, wherein determining the effect of the parent software update on the application at the client computer comprises:
determining an error caused by the parent software update to the operating system kernel on the application at the client computer.

4. The method of claim 2, wherein the operating system kernel comprises a Linux kernel, and wherein determining the effect of the parent software update on the application at the client computer comprises:
determining an error caused by the parent software update to the Linux kernel on the application at the client computer.

5. The method of claim 4, further comprising:
identifying the application as being affected by the parent software update to the Linux kernel; and
determining that the child software update is available for the identified application.

6. The method of claim 5, wherein causing the parent software update and the child software update to be sent to the client computer further comprises:
sending information for the child software update to the client computer.

7. The method of claim 6, further comprising:
causing one or more other child software updates for one or more other applications that are affected by the parent software update to the Linux kernel to be sent to the client computer, wherein vendors other than the first vendor provide the one or more other child software updates.

8. A system comprising:
a memory to store instructions; and
a processor to execute the instructions to:
receive update information for a plurality of software programs comprising a first software program provided by a first vendor and a second software program provided by a second vendor, wherein the first vendor is distinct from the second vendor, wherein the first software program comprises an operating system component, wherein the second software program comprises an application, wherein the application complements operation of the operating system component, and wherein the update information comprises dependency information regarding the application being dependent on updates to the operating system component;
determine a dependency of the application on a parent software update to the operating system component in view of the dependency information;
receive a request from a client computer for updates to the operating system component at the client computer, wherein the parent software update is responsive to fulfilling the request for updates to the operating system component at the client computer;
determine an effect of the parent software update on the application at the client computer in view of the dependency information;
select a child software update that modifies the application to compensate for the determined effect of the parent software update on the application at the client computer, wherein the second vendor provides the child software update and the first vendor provides the parent software update; and
in response to receipt of the request, cause the parent software update and the child software update to be sent to the client computer and installed at the client computer.

9. The system of claim 8, wherein the operating system component comprises an operating system kernel, and wherein the parent software update comprises an update to the operating system kernel.

10. The system of claim 9, wherein to determine the effect of the parent software update on the application at the client computer, the processor is to:
determine an error caused by the parent software update to the operating system kernel on the application at the client computer.

11. The system of claim 9, wherein the operating system kernel comprises a Linux kernel, and wherein to determine the effect of the parent software update on the application at the client computer, the processor is to:
determine an error caused by the parent software update to the Linux kernel on the application at the client computer.

12. The system of claim 11, wherein the processor is further to:
identify the application as being affected by the parent software update to the Linux kernel; and determine that the child software update is available for the identified application.

13. The system of claim 12, wherein to cause the parent software update and the child software update to be sent to the client computer, the processor is to:
send information for the child software update to the client computer.

14. The system of claim 13, wherein the processor is further to:
cause one or more other child software updates for one or more other applications that are affected by the parent software update to the Linux kernel to be sent to the client computer, wherein vendors other than the first vendor provide the one or more other child software updates.

15. A non-transitory computer readable storage medium comprising instructions that, when executed by a processor, cause the processor to perform operations comprising:
receiving, by the processor at a server system, update information for a plurality of software programs comprising a first software program provided by a first vendor and a second software program provided by a second vendor, wherein the first vendor is distinct from the second vendor, wherein the first software program comprises an operating system component, wherein the second software program comprises an application, wherein the application complements operation of the operating system component, and wherein the update information comprises dependency information regarding the application being dependent on updates to the operating system component;
determining, by the server system, a dependency of the application on a parent software update to the operating system component in view of the dependency information;
receiving, by the server system, a request from a client computer for updates to the operating system component at the client computer, wherein the parent software update is responsive to fulfilling the request for updates to the operating system component at the client computer;
determining, by the server system, an effect of the parent software update on the application at the client computer in view of the dependency information;
selecting, by the server system, a child software update that modifies the application to compensate for the determined effect of the parent software update on the application at the client computer, wherein the second vendor provides the child software update and the first vendor provides the parent software update; and
in response to receiving the request, causing the parent software update and the child software update to be sent to the client computer and installed at the client computer.

16. The non-transitory computer readable storage medium of claim 15, wherein the operating system component comprises an operating system kernel, and wherein the parent software update comprises an update to the operating system kernel.

17. The non-transitory computer readable storage medium of claim 16, wherein determining the effect of the parent software update on the application at the client computer comprises:
determining an error caused by the parent software update to the operating system kernel on the application at the client computer.

18. The non-transitory computer readable storage medium of claim 16, wherein the operating system kernel comprises a Linux kernel, and wherein determining the effect of the parent software update on the application at the client computer comprises:
determining an error caused by the parent software update to the Linux kernel on the application at the client computer.

19. The non-transitory computer readable storage medium of claim 18, further comprising:
identifying the application as being affected by the parent software update to the Linux kernel; and
determining that the child software update is available for the identified application.

20. The non-transitory computer readable storage medium of claim 19, wherein causing the parent software update and the child software update to be sent to the client computer further comprises:
sending information for the child software update to the client computer.

21. The non-transitory computer readable storage medium of claim 20, further comprising:
causing one or more other child software updates for one or more other applications that are affected by the parent software update to the Linux kernel to be sent to the client computer, wherein vendors other than the first vendor provide the one or more other child software updates.

* * * * *